United States Patent [19]

Boyer

[11] 4,001,617
[45] Jan. 4, 1977

[54] ROTARY ELECTRICAL MACHINES COMPRISING A SUPERCONDUCTIVE WINDING

[75] Inventor: Lionel Boyer, Alfortville, France

[73] Assignee: Agence Nationale de Valorisation de la Recherche, France

[22] Filed: May 29, 1975

[21] Appl. No.: 581,756

[30] Foreign Application Priority Data

June 7, 1974  France .............................. 74.19671

[52] U.S. Cl. .............................................. 310/52
[51] Int. Cl.² ......................................... H02K 9/00
[58] Field of Search ................ 310/64, 10, 40, 52, 310/198, 62, 63, 68, 68 B, 68 D, 268; 417/420, 368; 165/47, 56; 336/61, DIG. 1

[56] References Cited
UNITED STATES PATENTS

| | | | |
|---|---|---|---|
| 3,005,117 | 10/1961 | Buchhold | 310/10 |
| 3,242,418 | 3/1966 | Mela | 310/52 |
| 3,521,091 | 7/1970 | Halas | 310/52 |
| 3,644,766 | 2/1972 | Hughes | 310/40 |
| 3,648,082 | 3/1972 | MacNab | 310/10 |
| 3,679,920 | 7/1972 | MacNab | 310/52 |
| 3,742,265 | 6/1973 | Smith | 310/52 |
| 3,743,867 | 7/1973 | Smith | 310/52 |
| 3,764,835 | 10/1973 | Luck | 310/52 |

Primary Examiner—R. Skudy
Attorney, Agent, or Firm—Larson, Taylor and Hinds

[57] ABSTRACT

A rotary motor has a superconducting freely spinning field winding, A.C. armature windings and electrically conductive screen means connected to an output shaft. The field winding consists of a flat winding delivering a magnetic field whose lines of flux are parallel to the axis. The armature winding straddles the field winding and is separated therefrom by the screen means.

9 Claims, 4 Drawing Figures

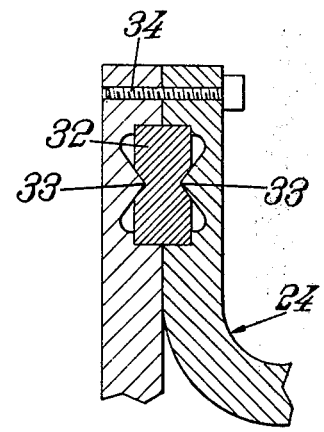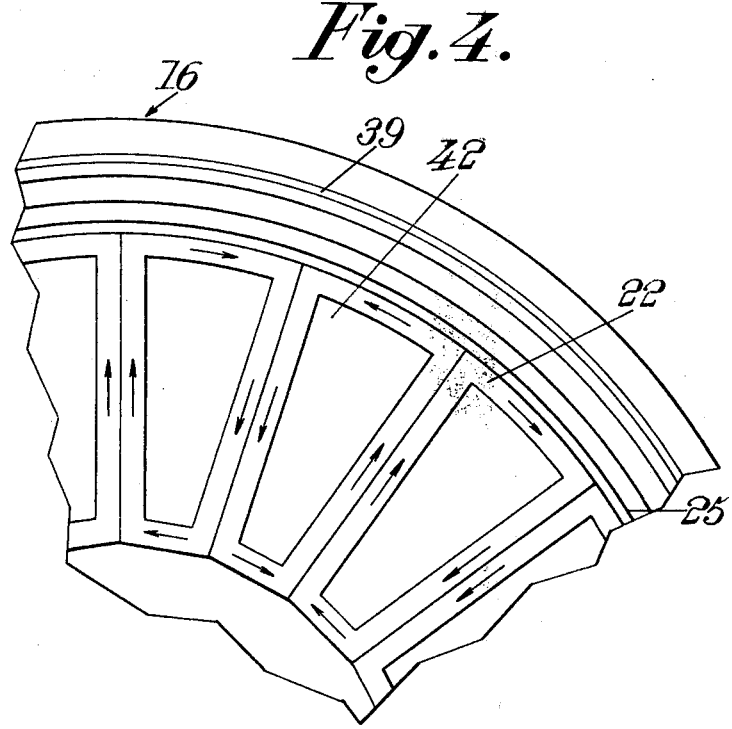

ROTARY ELECTRICAL MACHINES COMPRISING A SUPERCONDUCTIVE WINDING

BACKGROUND OF THE INVENTION

The invention relates to electrical machines comprising a rotary superconductive winding.

Electrical machines have been proposed which comprise a superconductive field winding disposed in a cryostat which can rotate around a shaft and is constructed to be supplied with direct current to produce a field rotating at the same speed as the field winding; stator windings adapted to be flowed through by three-phase currents to produce a rotary field cooperating with the field winding; and electrically conductive rotary means disposed between the field winding and the stator windings and adapted to be flowed through, during operation, by currents producing a field which tends to counteract the torque exerted on the field winding. The superconductive field winding rotates at the same speed as the rotary field supplied by the stator winding. Consequently, it is subjected only to a constant or very slowly-varying magnetic field, thus obviating the results of the magnetic hysteresis of superconductive materials. Furthermore, since no appreciable driving force is transmitted between the superconductive field winding and the components at room temperature, the necessary connections can have a sufficiently high thermal resistance to reduce to an acceptable value the rate of cooling required for maintaining the winding at superconductivity temperatures.

The present invention particularly relates to synchronous rotary machines, this term being used to define a machine wherein the electrically conductive means produce a field rotating in sychronism with the field winding. Machines of this kind are described in copending U.S. patent application Ser. No. 443,014 assigned to the assignee of the present invention. However, the invention also applies to asynchronous machines as described in copending U.S. patent application Ser. No. 412,127, now U.S. Pat. No. 3,904,901 and in U.S. Pat. No. 3,742,265 (Smith). The invention also applies to rotary transformers wherein one of the primary and secondary windings comprises stator windings and the other of which comprises windings comprising the aforementioned electrically conductive rotary means.

The units given in the aforementioned patent applications may be conisdered "cylindrical" in that the lines of force of the magnetic fields have a substantially radial orientation between the different field-producing means. That arrangement is satisfactory when the machine has a small number of poles (particularly in a two-pole machine) but has substantial drawbacks in the case of motors having a large number of poles. On the other hand, in some applications a large number of poles are required so that the shaft to which mechanical power is applied or which delivers power rotates at a low speed for a currently available a.c. frequency. This problem occurs inter alia in naval propulsion: propulsion assemblies are known which comprise a turbo-alternator rotating at high speed and supplying an asynchronous electric motor which is mounted directly on the propeller shaft and which must therefore be considerably slower than the turbo-alternator. To this end, the asychronous motor windings must have a large number of poles. If the number of poles is large, the field winding must have a large diameter and its flux is used on one side of the winding only (i.e. inefficiently) and the winding is relatively short relative to its diameter, resulting in a relatively high proportion of current return conductors, which play only a secondary part in the production of flux.

SUMMARY OF THE INVENTION

An object of the invention is to provide a rotary electrical machine wherein the aforementioned disadvantages are largely obviated. To this end, there is provided a machine wherein the field winding comprises a flat annular winding supplying a field whose field lines are substantially parallel to the axis of rotation of the field winding in the space between the field winding and the stator windings disposed on both sides of it in the axial direction and separated from the field winding by said electrically conductive means.

Due to that arrangement, use is made of the field provided by the superconductive field winding on both sides thereof, i.e. The result is comparable with that which would be obtained from a cylindrical machine having stator windings inside and outside the field winding, while the unit is simple to manufacture. In such machines having a large number of poles, the power obtained per unit mass of superconductive material used is much greater than for cylindrical machines.

The invention will be better understood from the following description of an asynchronous motor according to the invention and of a modified embodiment thereof, both embodiments being non-limitative. The description refers to the accompanying drawings.

SHORT DESCRIPTION OF THE DRAWINGS

FIG. 3 is a detail view corresponding to part III of FIG. 2, showing a modification; and FIG. 4 is a detail view along IV—IV of FIG. 2, showing how the stator windings are disposed.

DESCRIPTION OF THE PREFERRED EMBODIMENTS

Figure 1:
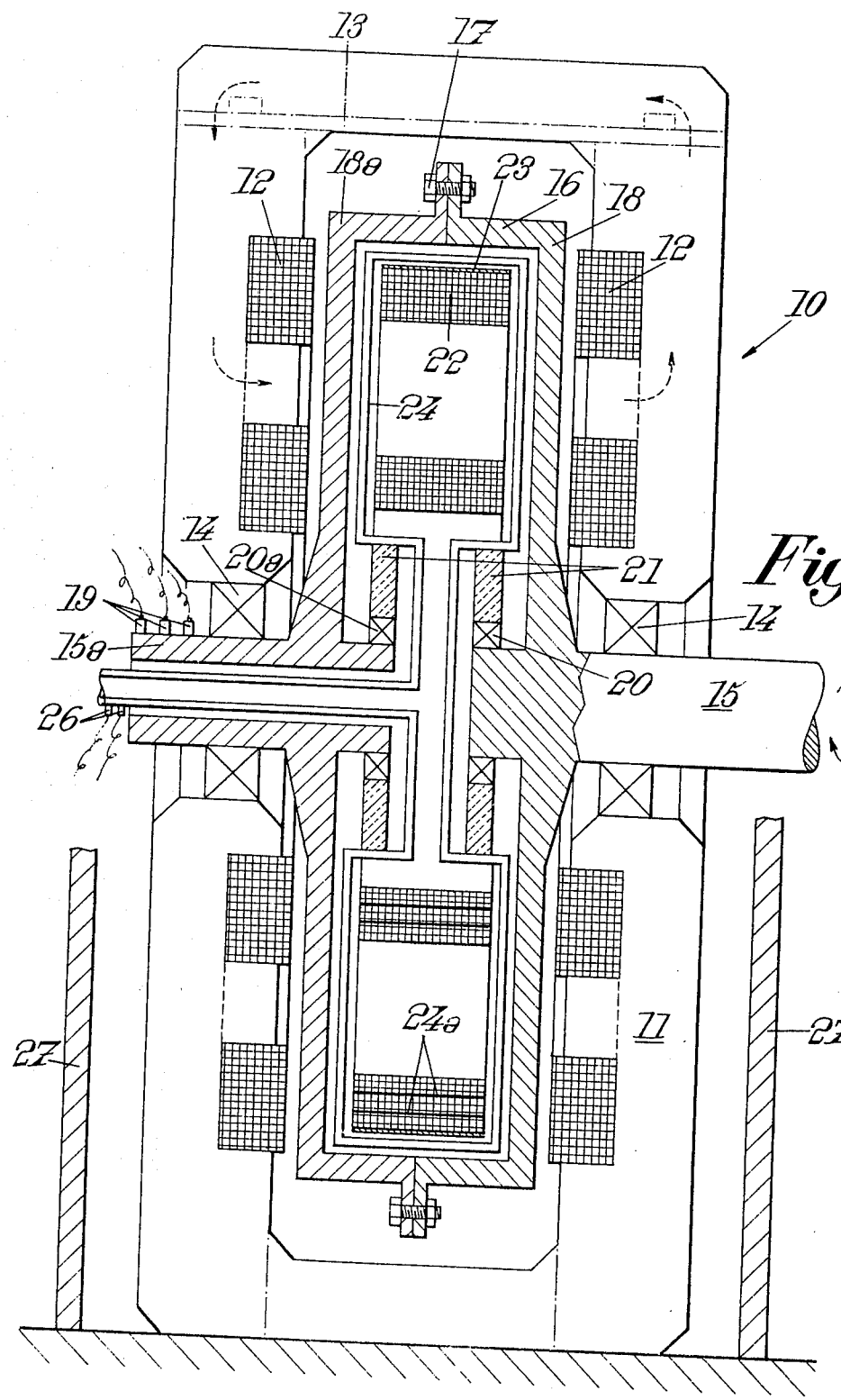
FIG. 1 is a simplified elevational view of the motor, in vertical section along a plane extending through its axis, showing the relative position of the various components.

Referring to FIG. 1, there is shown a motor 10 comprising a central rotary unit (in the axial direction) straddled by electrically conductive means (hereinafter called "armature screen" for simplicity) and by stator windings, which are furthest from the centre plane of the motor. The various components will now be described, outlining only the differences from the rotary machines described in the aforementioned patent applications, inter alia in application Ser. No. 412,127, now U.S. Pat. No. 3,904,901.

Motor 10 comprises a stationary frame 11 bearing stator windings 12. The poly-phase (e.g. three-phase) stator windings are connected to an a.c. source via conventional switching-off means. The windings are made of a material which is a good conductor of electricity and they operate at normal temperatures, i.e. slightly above room temperature owing to Joule-effect heating.

The stationary frame 11 may be a laminated magnetic carcass through which the flux circulates. If however, the stator windings have a large number of poles, the flux flows in the circumferential direction between the windings instead of being closed from one set of windings to the other parallel to the axis (as shown by the chain-line arrows) in the case of a two-pole assembly, and the peripheral parts of the carcass become unnecessary and can therefore be omitted, except for the parts 13 forming cross-pieces which secure the two halves of frame 11 as shown by dash-dot lines in FIG. 1.

Owing to the high value of the flux, which saturates the magnetic materials, frame 11 may alternatively be simply a structure for securing the windings 12 and bearing the rotary parts of the motor.

Frame 11 carries two bearings 14 for centring a shaft 15 which transmits the mechanical power supplied by the motor. The bearings should be sufficiently far from the centre plane of the motor to ensure that the magnetic flux through them is weak in spite of the high value of the flux supplied by the superconductive field winding.

In the embodiment shown in FIG. 1, shaft 15 is in two portions disposed one on each side of the centre plane of the motor. On one side of the centre plane, the shaft consists of a journal 15a rotating in the corresponding bearing 14.

The two shaft portions are secured by the armature screen 16, which is likewise in two symmetrical components secured by any suitable means such as bolts and nuts 17. Screen portions 18, 18a are connected respectively to shaft 15 and journal 15a or are in one piece therewith. Each half 18, 18a can be a solid plate. Alternatively, it can carry windings having a construction similar to that of the stator windings 12 and connected to rings 19 (three of four for a three-phase winding) connected to sliding contacts adapted either to supply the different winding phases adjustable resistors and to short-circuit the phases, or, if required, to energise the three phases from a D.C. or low-frequency three-phase electric generator (not shown) so as, in the last case, to achieve synchronous or even hypersynchronous operation.

As will be seen hereinafter, strong currents flow in the radial parts of screen portions 18, 18a when the motor is under load and delivers mechanical energy. These parts, which are in the form of plates, must be cooled, particularly when they carry windings. Cooling can be provided by means similar to those already described in the aforementioned patent applications. Alternatively, a heat-conveying gas (e.g. helium) can be circulated along the inner surfaces of the plates and then to a heat exchanger. Usually, however, it is preferable to maintain a partial vacuum between the plates to reduce heat conduction betwen the plates and the cryostat containing the field winding and to use liquid cooling.

The two shaft sections 15, 15a extend towards the central plane of the motor beyond the plates, to receive bearings 20, 20a for centring the cryostat 24 and the field winding. In the embodiment illustrated in FIG. 1, the bearings are separated from the cryostat by structures 21 having low thermal conductivity. Unless the field winding is out of centre, the structures do not have to transmit any axial force between the field winding and the shaft.

The field winding 22, which typically has a plurality of pairs of poles, is subjected only to centrifugal forces, since the electromagnetic forces merely tend to force the conductors toward each other, except at the periphery. The field winding can comprise coils moulded in a resin (e.g. an epoxy resin) retaining satisfactory mechanical properties at low temperature, and can be provided with a thin hoop 23 of material which is preferably a poor electrical conductor (e.g. stainless steel). In order to facilitate heat transfer and bring the field winding 22 more quickly to the superconductivity temperature after starting, heat sinks 24a, made e.g. of braided copper wire for reducing eddy currents, can be embedded in the coils as shown in FIG. 1.

The field winding 22 is enclosed in the cryostat 24, which comprises two concentric walls between which there is a high degree of vacuum (usually $10^{-5}$ to $10^{-6}$ mm Hg) and a super-insulating material can be provided. The outer wall of the cryostat can be a passive conductive screen for reducing the amplitude of the transients, so as to protect the superconductive winding from rapid variations in the field. The cryostat is provided with means (not shown) for supplying cryogenic fluid, usually comprising a supply of liquid helium and a return duct for gaseous helium. Sliding contacts 26, which are provided for building up a flow of direct current in the field winding, can be similar to those described in the aforementioned patent applications.

The superconductive field winding can be made of conventional material (elementary filaments of niobium-titanium alloy embedded in a copper matrix and in wire or taps form). A flat tape (e.g. 4mm × 2mm) is perhaps a more advantageous shape, since it avoids bearing forces tending to splay the field winding in the axial direction, reduces the amount of free space, i.e. the volume of impregnation material, and corresponds to a higher proportion of copper, thus improving the discharge of heat.

Bearings 20, 20a may be in the leakage flux of the field winding, but this is without too much consequence since the bearings have to withstand only a relatively low relative speed, corresponding to the amount of sliding of the armature screen 16.

An additional screen 27 can be placed around the machine to protect the outer installations from interference by the electromagnetic field of the field winding.

Figure 2:
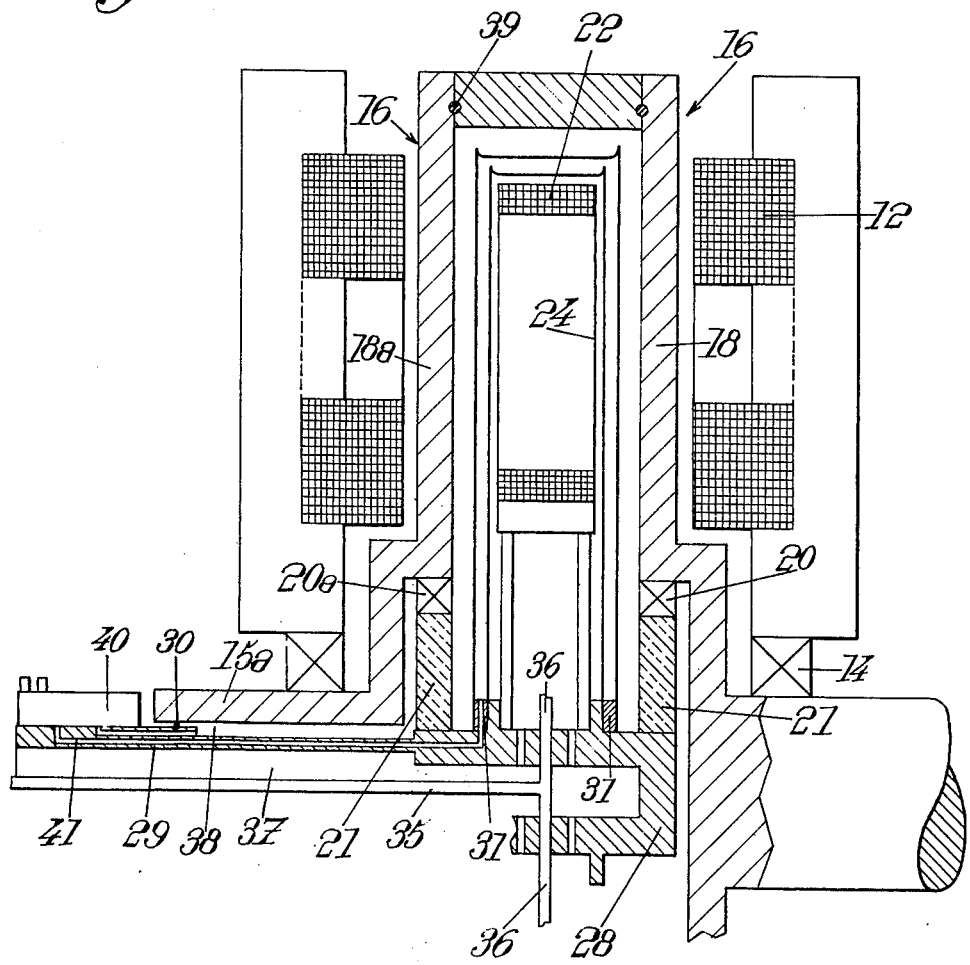
FIG. 2 is a more detailed view showing part of of a modified embodiment and showing more clearly how the cryostat is fed.

FIG. 2 where, for simplicity, elements corresponding to FIG. 1 bear the same references, is a more detailed view of the construction of the cryostat and its supply means. In FIG. 2, the rotating assembly comprising cryostat 24 and field winding 22 is borne by bearings 20, 20a mounted in recesses in plates 18, 18a of the armature screen 16. The rotary assembly is separated from the inner bearing races by structures 21 having high thermal resistance and made e.g. of reinforced laminated material so as to withstand the bending stresses due to axial forces on field winding 22.

The central rotary assembly comprises a central former 28 made of metal or composite material (e.g. epoxy resin reinforced by glass, boron or carbon fibres). The hollow former is connected to a duct 29 concentric with portion 15a. In the embodiment shown, a vacuum is maintained between the armature screen 16 on the one hand, and the cryostat and duct 29 on the other hand, thus requiring the use of a rotary seal 30, which incidentally has to withstand only slow relative speeds corresponding to sliding.

Former 28 carries two blocks 31 connected to the walls forming the opposite ends of the cryostat. The two walls of each end are connected to the corresponding rims by means which can be dismantled. In the embodiment shown in FIG. 2, overlap welds are used. Alternatively, more particularly to facilitate dismantling, the welds can be replaced by seals as shown in FIG. 3, which comprise a ring 32 made of a metal such as indium which is soft at low temperatures, locked between the side wall and one edge of the rim, each of which are formed with a groove having one or more knife-edges 33. In the latter case, the seals are mechanically secured by removable means, e.g. screws 34.

The cryogenic fluid (liquid helium, which is advantageously supercritical) is conveyed through a duct 35 along the axis of shaft section 15a. The liquid helium is distributed through the winding by branches in the form of a star 36 connected to the end of duct 35. Gaseous helium returns through an annular space 37 between duct 15 and tube 19, which is externally silver coated to prevent heat transfer through radiation. The annular space 38 between portion 15a and tube 29 communicates with the space between the cryostat and the armature screen 16. This entire space is preferably kept under a primary vacuum to reduce heat transfer and must of course be air tight. A sliding O-ring seal 30 is used for providing air tightness. Other O-ring seals 39 are disposed between the different components of the armature screen 16. Rotary seals, which can be of the same kind as those described in the afore-mentioned patent applications, are provided for connecting the liquid-helium supply and the return flow of gaseous helium to a stationary installation.

The space between the two cryostat chambers must be kept at a secondary vacuum. The space can be sealed. For greater reliability, however, it is preferable to provide pumping means. These means can comprise a static pump, which however requires rotary seals which are sealing-tight to a secondary vacuum. It appears more advantageous to include pump 40 in one of the rotary assemblies, and typically to connect it to the cryostat. In that case, there is no need for a rotary seal withstanding secondary vacuum. If two pumps are required, i.e. a secondary pump which starts at low pressure and can provide a vacuum of $10^{-5}$ or $10^{-6}$ mm Hg required in the cryostat and the connecting duct 41 and a primary priming pump, the latter pump can be used to provide a vacuum in space 38.

The stator can have the same construction as described with reference to FIG. 1. The superconductive field winding is not subjected to any force parallel to the axis as long as it is exactly centred in the armature screen and in the stator windings. If, on the other hand, it becomes slightly offset in the axial direction with respect to a central position, it may be subjected to a force which tends to increase the axial offset. It may be necessary, therefore, to design structures 21 capable of absorbing such forces or to provide means adapted to more the field winding back to the centre position. The last-mentioned means can be a control circuit causing an additional current to flow in the windings 12 borne by one of the structures, the additional current tending to counteract the decentring force. The control circuit can be actuated by axial-force pick-up probes (e.g. a strain gauge borne by structures 21). The control circuit can also be completely independent of the main stator windings and can control the current flowing in supplementary windings having a small number of turns.

The main stator windings can be disposed as shown diagrammatically in FIG. 4 and can be made up of adjacent coils each borne by an insulating former 42 made e.g. of epoxy resin, the adjacent surfaces of the coils being in contact with one another and the entire assembly being formed in one piece by impregnation.

A motor of the aforementioned kind can be used for directly driving an engine shaft for ship propulsion and can be associated with a turbo-alternator, thus constituting a speed reduction gear. If, for example, the current supplied by the turbo-alternator is 50 Hz, a motor having 10 pairs of poles is sufficient to reduce the speed to 300 r.p.m.

The embodiments which have been described comprise asynchronous motors, but the invention is applicable to other motors normally used in cylindrical configuration.

I claim:

1. In a rotary electrical machine comprising: a superconductive field winding located in a cryostat, mounted for rotation around an axis, and producing a field rotating at the same speed as the field winding when direct current circulates therein; stator windings arranged to produce a field rotating at the same speed as the field winding when poly-phase currents flow therethrough and cooperating with the field winding; and electrically conductive rotary means carried by a mechanical power transmission shaft and disposed between the field winding and the stator windings through which flow, during operation, currents for producing a field which counteracts the torque exerted on the field winding, the improvement comprising a flat annular winding constituting the field winding and supplying a field the field lines of which are substantially parallel to the axis of rotation of the field winding in the space between the field winding and the stator windings, said stator windings axially straddling the field winding and being separated therefrom by said electrically conductive means.

2. A machine according to claim 1, wherein the stator windings have a plurality of pairs of poles.

3. An electrical motor according to claim 1, wherein the electrically conductive rotary means comprise two plates each disposed on one side of the field winding in the axial direction and borne by shaft, the plates being made of conductive material.

4. A motor according to claim 3, wherein the shaft is in two portions each bearing one of the plates, the two plates being non-rotatably secured to one another.

5. A motor according to claim 4, wherein the shaft portions are each centred by the bearing secured to a stationary frame bearing the stator windings.

6. A motor according to claim 4, wherein the cryostat is supplied with cryogenic fluid by ducts extending inside one of the shaft portions.

7. A machine according to claim 1, having a pump connected to maintain a vacuum between the cryostat walls and carried by the electrically conductive rotary means.

8. A machine according to claim 1, having heat drains made of a heat conducting material embedded in the field winging to increase the heat transfer between the field winding and a cryogenic fluid in the cryostat.

9. An electrical motor according to claim 1, wherein the electrically conductive rotary means comprise two plates each disposed on one side of the field winding in the axial direction and borne by a shaft transmitting the mechanical power supplied by the motor, said plates carrying a poly-phase rotor winding connected to sliding electrical contacts.

* * * * *